United States Patent [19]

Sugimoto

[11] 4,435,987
[45] Mar. 13, 1984

[54] DEVICE FOR CORRECTING TORQUE DETECTED BY AN ELECTRIC DYNAMOMETER

[75] Inventor: Hiroshi Sugimoto, Hyogo, Japan

[73] Assignee: Mitsubishi Denki Kabushiki Kaisha, Tokyo, Japan

[21] Appl. No.: 351,895

[22] Filed: Feb. 24, 1982

[30] Foreign Application Priority Data

Feb. 25, 1981 [JP] Japan .................................. 56-27240

[51] Int. Cl.$^3$ .............................................. G01L 3/22
[52] U.S. Cl. ................................................. 73/862.17
[58] Field of Search .................. 73/862.17–862.19, 73/116

[56] References Cited

U.S. PATENT DOCUMENTS 4,169,372 10/1979 Colwill et al. .................... 73/862.18

FOREIGN PATENT DOCUMENTS 52-45987 4/1977 Japan ................................ 73/862.17
52-51982 4/1977 Japan ................................ 73/862.17
52-68481 6/1977 Japan ................................ 73/862.17

Primary Examiner—Charles A. Ruehl
Attorney, Agent, or Firm—Bernard, Rothwell & Brown

[57] ABSTRACT

A device for correcting the torque detected by an electric dynamometer, which is capable of very accurately correcting loss torques of the operation-type dynamometer based upon a simply constructed mechanism. Among many loss torques involved in the operation-type electric dynamometer, the windage-loss torque which plays a major role is accurately corrected as a function of the atmospheric pressure, atmospheric temperature and rotation speed, thereby to very accurately correct the torque.

5 Claims, 3 Drawing Figures

DEVICE FOR CORRECTING TORQUE DETECTED BY AN ELECTRIC DYNAMOMETER

BACKGROUND OF THE INVENTION

1. Field of the Invention

The present invention relates to a device for correcting torque detected by an electric dynamometer which is made up of a rotary machine, i.e., which is made up of a motor or a generator.

2. Description of the Prior Art

There has been proposed an electric dynamometer which is made up of a rotary machine, and specifically a dynamometer (hereinafter referred to as operation-type dynamometer) of the type which does not employ a swinging mechanism for the stator or a weighing device to measure the torque, but which detects the armature current, armature voltage, rotation speed or field magnetic flux thereby to calculate the torque relying upon the detected values. In this operation-type dynamometer, the torque $T_M$ which acts between the yoke and the armature of the dynamometer is corrected by taking into consideration the friction torque $T_X$ of the bearings, windage-loss torque $T_Y$ of the rotor and eddy-current-loss torque $T_Z$ in the armature, thereby to precisely find the torque. Namely, the torque T calculated by the operation-type dynamometer is given by the following equation, $$T = T_M - (T_X + T_Y + T_Z + \ldots) \quad (1)$$

FIG. 1 is a graph illustrating a relation between the rotation speed N and the above-mentioned loss torques $T_X$, $T_Y$ and $T_Z$, in which the abscissa represents the rotation speed N and the ordinate represents loss torques. The total loss torque $T_T$ represents the sum of friction torque $T_X$ of the bearings, windage-loss torque $T_Y$ of the rotor, and eddy-current-loss torque $T_Z$ in the armature.

Most of the total loss torque $T_T$ consists of friction torque $T_X$, windage-loss torque $T_Y$ and eddy-current-loss torque $T_Z$. The sum of these loss torques $T_X$, $T_Y$ and $T_Z$ rises up to about several percent of the rated torque of the operation-type dynamometer. To more precisely calculate the torque, therefore, the loss torques must be corrected more precisely. In practice, therefore, the total precision of the operation-type dynamometer is determined by the precision for detecting the terms $T_X$, $T_Y$ and $T_Z$ in the above-mentioned equation (1).

As will be obvious from FIG. 1, furthermore, the total loss torque $T_T$ does not change simply in proportion to the rotation speed N, but changes in a complicated manner. According to the conventional art, therefore, complicated mechanisms were necessary if it was attempted to correct the loss torques more precisely, and this fact resulted in the increase in the manufacturing cost of the dynamometer. Because of this reason, the operation-type dynamometer was not used extensively.

SUMMARY OF THE INVENTION

The object of the present invention is to provide a device for correcting the torque detected by an electric dynamometer, which is free from the defects inherent in the above-mentioned conventional art, and which is capable of very accurately correcting loss torques of the operation-type dynamometer based upon a simply constructed mechanism.

Here, as will be obvious from FIG. 1, the friction torque $T_X$ of the bearings and the eddy-current-loss torque $T_Z$ among the loss torque, change according to predetermined relations depending upon the rotation speed and the field intensity, provided the dynamometer is elaborately constructed. In other words, the friction torque $T_X$ of the bearings and the eddy-current-loss torque $T_Z$ are affected very little by the change in the natural environment.

Unlike the friction torque $T_X$ and the eddy current loss torque $T_Z$, however, the windage-loss torque $T_Y$, i.e., the air resistance loss is greatly affected by the atmospheric pressure P and by the atmospheric temperature t. Namely, the quantity of change reaches up to 0.3 to 0.5% the rated torque of the operation-type dynamometer.

The windage-loss torque $T_Y$ of the rotor is given by the following equation (2) relative to the atmospheric pressure P, the absolute temperature t of the atmosphere and the rotation speed N, $$T_Y = k_2 \cdot P/t \cdot N \quad (2)$$

where $k_2$ is a coefficient determined by the construction of the dynamometer, i.e., determined by the aerodynamic construction.

As mentioned above, loss torques for correcting the output torque of the operation-type dynamometer have different characteristics. That is, the friction torque $T_X$, windage-loss torque $T_Y$ of the rotor which varies in proportion to the rotation speed N, and eddy-current-loss torque $T_Z$ have different characteristics. Therefore, the loss torques vary incessantly accompanying the change in the atmospheric temperature and pressure. The loss torques $T_X$, $T_Y$ and $T_Z$, therefore, should be adjusted and set independently. The present invention was accomplished by giving attention to this point.

PREFERRED EMBODIMENT OF THE INVENTION

Figure 1:
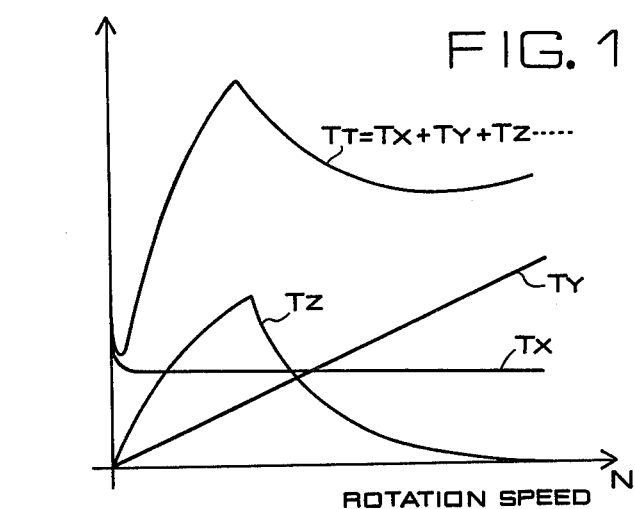
FIG. 1 is a graph showing relations between the rotation speed N and loss torques in the operation-type dynamometer.
Figure 2:
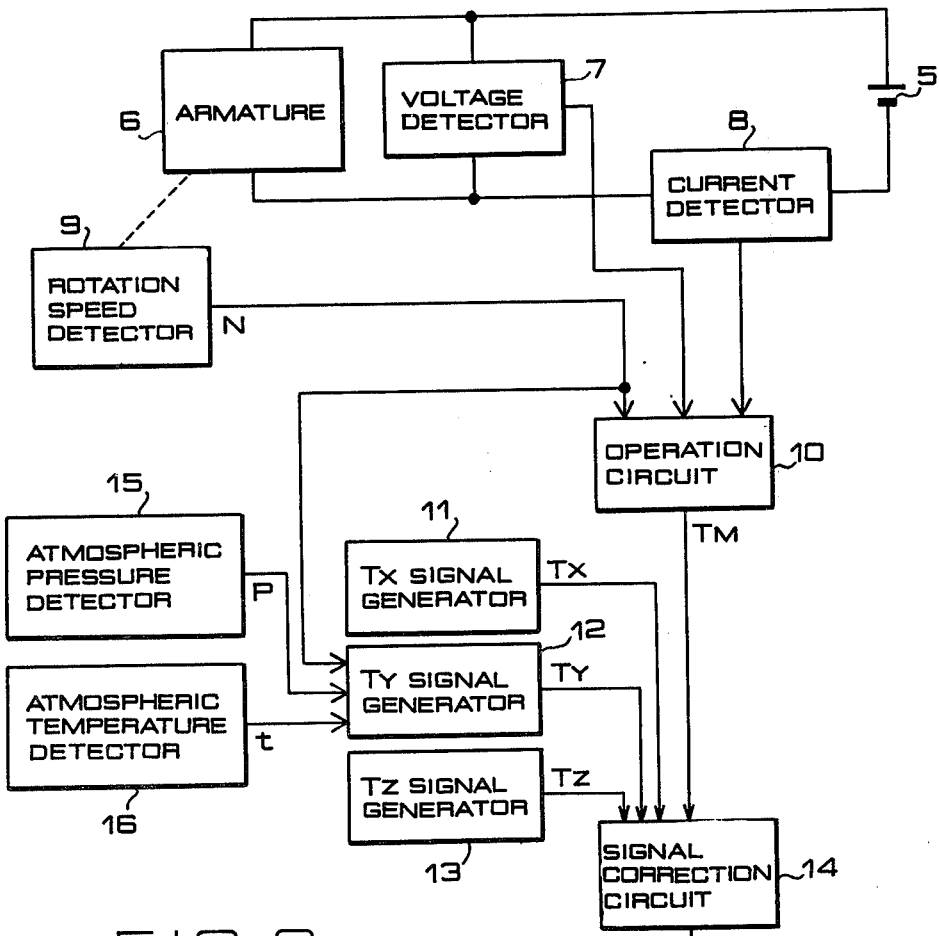
FIG. 2 is a block diagram showing a device for correcting torque detected by the electric dynamometer according to an embodiment of the present invention.

FIG. 2 illustrates an embodiment of the present invention, in which a DC power supply 5 is connected to an armature 6 of an electric dynamometer. A voltage detector 7 is connected to the armature 6 to detect the terminal voltage of the armature 6. Further, a current detector 8 is inserted between the armature 6 and the negative electrode of the DC power supply 5 to detect the armature current. A rotation-speed detector circuit 9 is connected to the armature 6 to detect the rotation speed of the armature 6. The outputs of the voltage detector 7, current detector 8 and rotation-speed detector circuit 9 are sent to an operation circuit 10 where the torque $T_M$ produced by the armature 6 is calculated relying upon these outputs. The thus calculated torque $T_M$ is sent to a signal correction circuit 14. Outputs of a friction torque correction signal generator 11, windage-loss torque correction signal generator 12, and eddy-current-loss torque correction signal generator 13, are fed to the signal correction circuit 14. The windage-loss torque correction signal generator 12 is served with outputs from the rotation-speed detector circuit 9, from an atmospheric pressure detector 15 and from an atmospheric temperature detector 16.

The signal correction circuit 14 corrects the torque $T_M$ which is calculated by the operation circuit 10, relying upon the signals produced by the torque correction signal generators 11 to 13, and produces the calculated torque $T_M$-$(T_X+T_Y+T_Z)$ of the dynamometer.

The friction torque $T_X$ is the one which is required for rotating the dynamometer under the condition in which the field magnetic flux is set to zero (depending upon the cases, a current may be allowed to flow to cancel the residual magnetic flux) and the atmospheric pressure is set to a very small value. Under this condition, if the atmospheric pressure is returned to normal value, the windage-loss torque $T_Y$ is created. In this case, the amount of change can be measured as a function of the atmospheric pressure and the atmospheric temperature.

Using the thus constructed torque correction circuit, the torque $T=T_M-(T_X+T_Y+T_Z)$ is found; i.e., errors in the calculated torque can be corrected.

Figure 3:
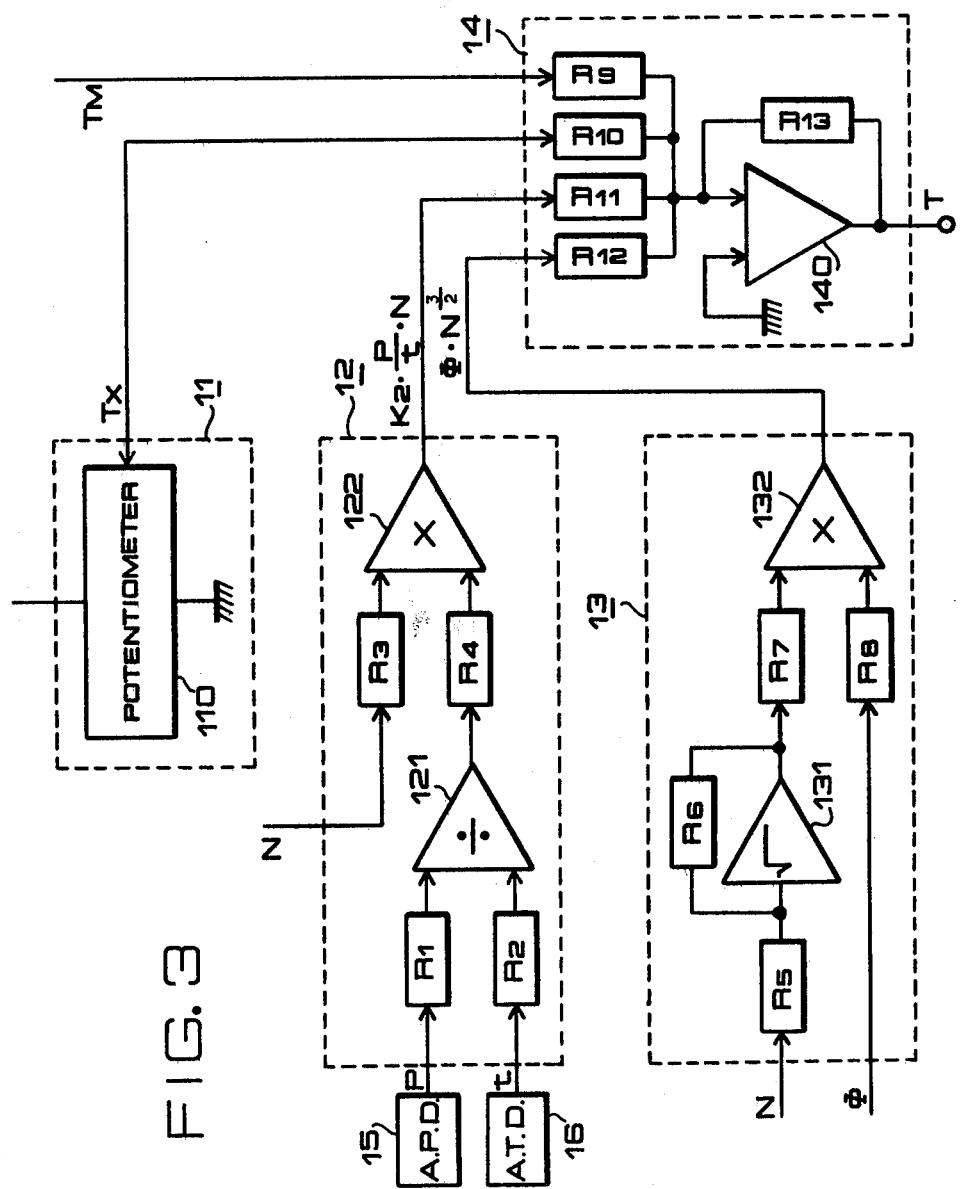
FIG. 3 is a block diagram which illustrates in detail the device of FIG. 2.

FIG. 3 is a block diagram showing, in detail, the device of FIG. 2, in which the same portions as those of FIG. 2 are denoted by the same reference numerals.

The friction torque correction signal generator 11 consists of a potentiometer 110 which sets the friction torque $T_X$. The windage-loss torque correction signal generator 12 includes an input resistor $R_1$ which receives the output P from the atmospheric pressure detector 15 and an input resistor $R_2$ which receives the output t from the atmospheric temperature detector 16. The output signals through the input resistors $R_1$, $R_2$ are transmitted to a divider 121 in the windage-loss torque correction signal generator 12, and the resulting calculated value is transmitted to one input of a multiplier 122 via a resistor $R_4$. The output N of the rotation speed detector circuit 9 is transmitted to another input of the multiplier 122 via an input resistor $R_3$. The multiplier 122 sends an output $k_2.P/t.N$ to an input resistor $R_{11}$ of the signal correction circuit 14 that will be mentioned later.

The output N of the rotation-speed detector circuit 9 is fed to an input resistor $R_5$ of the eddy-current-loss torque correction signal generator 13. The input resistor $R_5$ is connected to an operation unit 131, and a feedback resistor $R_6$ is so connected as to by-pass the operation unit 131. The output $N^{3/2}$ of the operation unit 131 is transmitted to a multiplier 132 via a resistor $R_7$. On the other hand, a magnetic flux signal $\phi$ is transmitted to another input terminal of the multiplier 132 via a resistor $R_8$. The output $\phi.N^{3/2}$ of the multiplier 132 is transmitted to an input resistor $R_{12}$ of the signal correction circuit 14. The signal correction circuit 14 further receives the output $T_M$ from the operation unit 10 (see FIG. 2) via an input resistor $R_9$. The outputs fed to the input resistors $R_9$ to $R_{12}$ of the signal correction circuit 14 are transmitted to a signal adder 140. A feedback resistor $R_{13}$ is so connected as to by-pass the signal adder 140.

The magnetic flux signal $\phi$ fed to the multiplier 132 of the eddy-current-loss torque correction signal generator 13 is produced by the motor or the generator, and is given by the following relation (3), $$\phi = B.E/N \qquad (3)$$

where N represents the rotation speed, E represents the counter electromotive force, and B represents a proportional constant.

Here, the output $\phi.N^{3/2}$ of the multiplier 132 corresponds to the eddy-current-loss torque $T_Z(=\phi.N^{3/2})$ of the armature, and is fed to the signal adder 140 via the input resistor $R_{12}$.

As mentioned above, the signal adder 140 is served with output signals of the negative polarity from the friction torque correction signal generator 11, from the windage-loss torque correction signal generator 12, and from the eddy-current-loss torque correction signal generator 13, and is further served with the output signal $T_M$ of the positive polarity from the operation circuit 10 (FIG. 2) via the input resistor $R_9$. Therefore, the signal adder 140 derives the signal T that is given by the following equation (4), $$T = T_M - \left( T_X + k_2 \cdot \frac{P}{t} \cdot N + \phi \cdot N^{\frac{3}{2}} \right) \qquad (4)$$

$$= T_M - (T_X + T_Y + T_Z)$$

The above signal T is produced by the signal correction circuit 14. Although the above-mentioned embodiment has dealt with the dynamometer made up of a DC machine, it should be noted that the present invention is in no way limited thereto, but can also be applied to the dynamometer made up of an AC machine.

According to the present invention as described above, the windage-loss torque which plays a major role among the loss torques of the operation-type dynamometer, is accurately corrected as a function of the atmospheric pressure, atmospheric temperature and rotation speed. Consequently, the operation-type dynamometer can be easily obtained featuring high precision.

What is claimed is:

1. A device for correcting torque detected by an electric dynamometer comprising:
   (a) detection means for detecting at least an armature current, an armature voltage and a rotation speed of the electric dynamometer and generating outputs comprising detection signals;
   (b) an operation circuit calculating the torque that acts between the yoke and the armature of the electric dynamometer, upon receipt of detection signals from said detection means, and providing an output;
   (c) a windage-loss torque correction signal generator generating an output comprising a windage-loss torque correction signal upon receipt of an output related to the rotation speed sent from said detection means, an output comprising a detection signal sent from an atmospheric pressure detector and an output comprising a detection signal sent from an atmospheric temperature detector;
   (d) a friction torque correction signal generator generating an output comprising a friction torque correction signal of the bearings of the electric dynamometer;

(e) an eddy-current-loss torque correction signal generator generating an output comprising an eddy-current-loss torque correction signal; and (f) a signal correction circuit subtracting the sum of said correction signals from the output of said operation circuit, upon receipt of the output from said operation circuit, said windage-loss torque correction signal, said friction torque correction signal, and said eddy-current-loss torque correction signal.

2. A device for correcting torque detected by an electric dynamometer according to claim 1, wherein said friction torque correction signal generator is made up of a potentiometer setting a value that corresponds to the friction torque of the bearings of the electric dynamometer.

3. A device for correcting torque detected by an electric dynamometer according to claim 1, wherein said windage-loss torque correction signal generator comprises a divider dividing the outputs of said atmospheric pressure detector and said atmospheric temperature detector and providing an output from said divider, and a multiplier multiplying the output of said divider by the output related to rotation speed received from said detection means.

4. A device for correcting torque detected by an electric dynamometer according to claim 1, wherein said eddy-current-loss torque correction signal generator comprises an operation unit arithmetically operating the output related to rotation speed received from said detection means, and a multiplier multiplying the output of said operation unit by a magnetic flux signal that is derived from the rotation speed of the electric dynamometer and a counter electromotive force.

5. A device for correcting torque detected by an electric dynamometer according to claim 1, wherein said signal correction circuit comprises an adder circuit adding the output of said friction torque correction signal generator, the output of said windage-loss torque correction signal generator, the output of said eddy-current-loss torque correction signal generator, and the output of said operation circuit.

* * * * *